United States Patent [19]

Pouillange et al.

[11] 4,350,861
[45] Sep. 21, 1982

[54] APPARATUS FOR HEATING STRIP ELEMENTS IN A CONTINUOUS PASS PROCESS BY ELECTROMAGNETIC INDUCTION

[75] Inventors: Jean P. Pouillange, Aulnay-sous-Bois; Jean P. Gaydon, Marly-le-Roi; Bernard Chausse, Bourg-la-Reine, all of France

[73] Assignee: Compagnie Electro-Mecanique, Paris, France

[21] Appl. No.: 166,846

[22] Filed: Jul. 8, 1980

[30] Foreign Application Priority Data

Jul. 9, 1979 [FR] France .................. 79 17717

[51] Int. Cl.³ .............................................. H05B 6/10
[52] U.S. Cl. ........................... 219/10.61 R; 219/10.79; 219/10.75; 219/10.49 R; 219/471
[58] Field of Search ............... 219/10.61 A, 10.61 R, 219/10.49 A, 10.49 R, 469, 470, 471, 10.75, 10.79, 10.57; 148/154; 310/77; 242/156, 156.2; 57/88

[56] References Cited

U.S. PATENT DOCUMENTS

| | | | |
|---|---|---|---|
| 2,652,478 | 9/1953 | Howard | 219/10.49 A |
| 2,812,144 | 11/1957 | Mitchell | 242/156 X |
| 3,000,106 | 9/1961 | Christgau | 34/1 |
| 3,200,230 | 8/1965 | Bretoniere | 219/10.61 A |
| 3,272,956 | 9/1966 | Baermann | 219/10.61 R |
| 3,749,955 | 7/1973 | Fetzer | 310/77 X |

FOREIGN PATENT DOCUMENTS

| | | | |
|---|---|---|---|
| 474140 | 3/1929 | Fed. Rep. of Germany | 219/10.61 |
| 699721 | 12/1940 | Fed. Rep. of Germany | 219/10.61 |
| 971925 | 4/1959 | Fed. Rep. of Germany | 219/10.61 |
| 1003866 | 3/1952 | France . | |
| 1292053 | 3/1962 | France . | |
| 1323071 | 2/1963 | France | 219/10.61 X |
| 1387653 | 12/1964 | France | 219/10.61 |
| 1453348 | 8/1966 | France . | |
| 420143 | 8/1933 | United Kingdom | 219/10.61 |
| 756565 | 9/1956 | United Kingdom | 219/10.61 |
| 1085244 | 9/1967 | United Kingdom | 219/10.61 |

Primary Examiner—B. A. Reynolds
Assistant Examiner—Philip H. Leung
Attorney, Agent, or Firm—Burns, Doane, Swecker & Mathis

[57] ABSTRACT

Apparatus for heating thin items in a continuous pass by induction includes an inductor driven in rotation inside a drum made of refractory material. The strip of material to be heated is driven by rollers in order to form a loop around the drum. When the strip is a metallic one, it forms the inductive element of the device. The inductor generates constant strength magnetic fields which are moved in relation to the inductive element, to thereby heat it.

9 Claims, 3 Drawing Figures

APPARATUS FOR HEATING STRIP ELEMENTS IN A CONTINUOUS PASS PROCESS BY ELECTROMAGNETIC INDUCTION

BACKGROUND OF THE INVENTION

The present invention relates to a device for heating long, thin items in a continuous pass by means of electromagnetic induction. In particular, it relates to the inductive heating of thin strip metallic items, such as sheets and strips.

The heating of metallic items by means of electromagnetic induction is widely used, on an industrial basis, for some types of items. However, the inductive heating technique is limited to items of modest size, normally not exceeding the size of steel billets. Furthermore, it is reserved to the discontinuous processing of separate items on an individual basis.

In contrast to this technique, long thin items, such as metal sheets, are usually heated in fuel or gas furnaces in a continuous process. The heating time constant of the metal sheets in the furnace often imposes a requirement of rather long duration for the passage of each sheet through the furnace. This results in the need for a substantial amount of space in terms of length inside the furnace, and hence considerably increases the size of the furnace.

One of the requirements for continuous processing of sheet materials in furnaces is that the material be fed through the furnace at a constant rate. In order to accomodate for this requirement, it becomes necessary to provide a substantial amount of space for storage for strips or sheets of material to be heated. Consequently, the size of the processing installation, and hence its cost, are further increased. In addition, the energy efficiency of furnaces used in this process is sometimes rather poor.

The most common devices for induction heating which are presently used are provided with fixed induction coils for generating variable magnetic fields. These coils use a large amount of reactive energy and thus, in view of the large amounts of power consumed, require compensating devices such as condenser sets. The current requirements of these devices also lead to important additional losses through Joule's effect. These losses appreciably harm the yield of the installations and thus further diminish their efficiency.

In contrast to prior art induction heating techniques, the present invention uses magnetic fields of constant strength which are mechanically moved. This feature of the invention considerably reduces the consumption of reactive energy and considerably improves efficiency.

Induction heating devices, using constant strength magnetic fields, have previously been proposed. However, they are neither conceived nor adapted for heating thin items in a continuous pass.

OBJECT AND BRIEF SUMMARY OF THE INVENTION

It is therefore a principle object of the present invention to achieve the heating of items such as metal sheets or strips in a continuous pass by electromagnetic induction while using a minimum of reactive energy and with an efficiency much higher than that of existing devices.

In accordance with this and other objects and advantages of the present invention, the inductive heating elements and the apparatus for guiding and driving the items to be heated are closely associated with one another so as to provide for rapid heating of long, thin items in a rapid continuous pass process. For those instances in which the speed of the heating process is an important consideration, such as during the annealing of sheets, the rapid heating capabilities of the present invention enable high sheet feed rares to be obtained.

In a preferred embodiment of this invention, the long and thin metallic items are supported, guided and driven by and around one or more drums inside which a constant strength magnetic field is moving in a rotary motion about the axis of each drum. The constant strength magnetic field is generated by permanent magnets or by electromagnets fed with direct current.

The magnetic field used in connection with the present invention can be of the heteropolar type, wherein the magnets or electromagnets are driven in rotation. Alternatively, the field can be of the homopolar type, wherein a rotor with variable resistance is placed in the field of an axial coil and is then driven in rotation. For example, an electric motor with fixed or variable speed, for driving a rotor on which one or several pairs of magnets or electromagnets are mounted, can be used to generate the constant strength field. The rotor rotates inside a concentric drum made from electrically insulating refractory (i.e. thermally resistant) material. The drum is preferably quite thin so as to reduce interferric space. The long and thin metallic item to be heated winds around the outside cylindrical surface of the drum in one spire, or convolution, and is guided by driving rollers into engagement with, and from, the drum.

One of the major advantages of the present invention is that it does not impose a systematic occultation or blocking of the lateral walls of the heating drum during continuous pass of the item to be heated, thus permitting the easy engagement and disengagement of the item from the heating facility, frequent inspections and easy maintenance of the heating installation, as well as a very efficient axial ventilation of the inside of the drum.

It will be appreciated that several successive heating units may be installed if necessary to meet technical requirements.

BRIEF DESCRIPTION OF THE DRAWINGS

The present invention will be described in greater detail in the following description of preferred embodiments thereof with reference to the accompanying drawings, in which.

DETAILED DESCRIPTION

Figure 1:
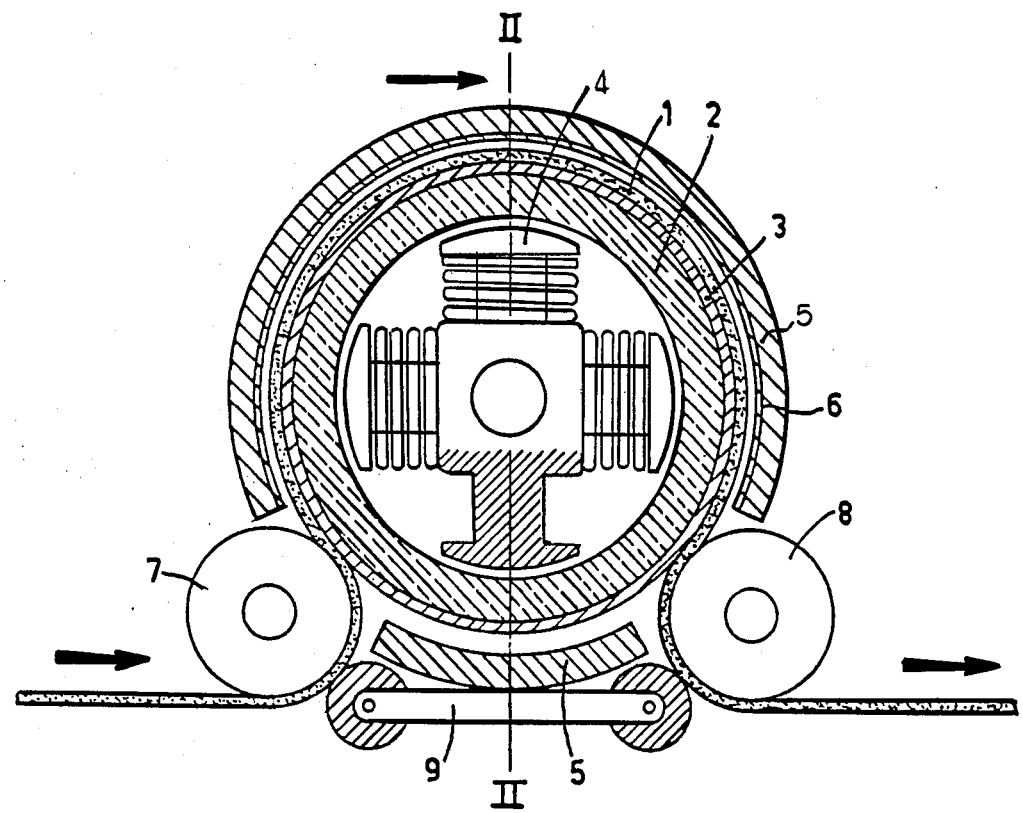
FIG. 1 is a transverse cross-sectional view, along the section line I—I of FIG. 2, of a heating unit constructed according to the present invention.

Referring now to FIG. 1, a thin, long item 1 to be heated is guided into engagement with a drum 2 of the heating unit by means of a roller 7 (and a series of other rollers not shown) and guided from engagement with the drum and towards the outside of the heating facility by means of a roller 8 (and a series of other rollers not shown). The item 1 forms an approximately circular loop and moves in the direction shown by the arrows in FIG. 1. The drum 2 is made from electrically insulated refractory material having good mechanical properties, such as concrete, for example. The drum is preferably reinforced and can be conveniently cooled by providing channels along its generatrix. In the embodiment shown, the drum is provided with a belt, i.e., a thin crown 3 made up of a material with very good mechanical properties, for example refractory steel. This crown can rotate about its axis.

An induction rotor 4 is mounted inside the drum 2. The rotor is comprised of a series of magnetized poles 10 each disposed parallel to the generatrix of the drum 2, with the series arranged coaxially with the drum. The poles of the inductor can be permanent magnets, or electromagnets fed with direct current, with alternating polarities. The number of poles to be used in a particular installation can be determined from the desired heating capabilities.

The rotor 4 is driven in rotation by a motor having either fixed or variable speed in order to generate relative motion between the item to be heated and the constant strength magnetic field.

Alternatively, it is possible to obtain motion of the constant strength magnetic field by means of a homopolar machine, in which the poles of the inductor all have the same polarity. In this case, means for generating the field are provided outside the area of action of the poles.

Figure 2:
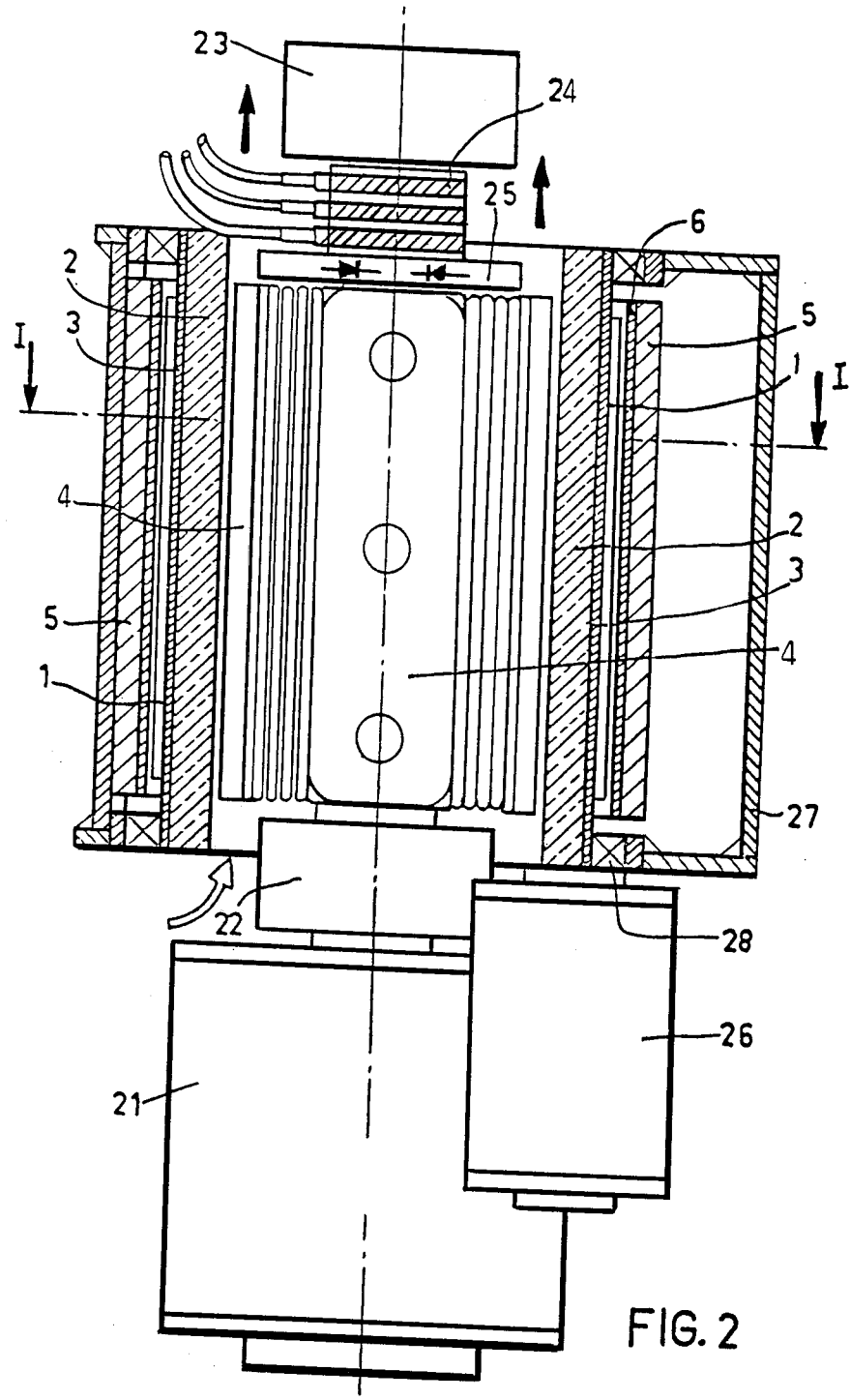
FIG. 2 is a vertical, partially cross-sectional view, along the section line II—II of FIG. 1, of the heating unit.

In order to avoid unwanted dispersion of the magnetic flux, a yoke 5 is placed around the drum, with an appropriate interferric space left between the yoke and the drum, to provide a return path for magnetic flux around the loop. The yoke is made from a magnetic material, and is thermally protected by a refractory coating 6. The yoke shown in FIGS. 1 and 2 is appreciably cylindrical with openings to allow for the passage of the strip 1 and to accommodate the guiding rollers 7 and 8. The yoke may conveniently be comprised of foliated metal sheets.

To electrically close the loops of induced currents in the item 1, and to avoid a sudden discontinuity of heating at the input and output portions of the heating device, an electrical shunt 9 can be provided between the respective portions of the item 1 in contact with the rollers 7 and 8. The shunt 9 is made from a material having good electrical conducting properties. In the embodiment of FIG. 1, the shunt includes two rollers connected by a rod and engaging the item 1 at the input and output ends of the heating device, respectively.

In order to facilitate the engagement and the disengagement of the item 1 with the drum 2, and to balance traction on the time that is generated by the rotating inductors, the rollers 7 and 8 can be driven by means of motors, for example. It is also feasible to drive the drum 2. If the drum is driven by an electric motor, the motor can function as a motor-brake to contribute to the balancing of the driving couple generated by the motion of the inductors.

Referring now to FIG. 2, the driving sources for the various elements of the heating devices are illustrated. The inductive rotor 4, supported by two bearings 22 and 23, and driven at a fixed or a variable speed by a motor 21, is fed direct current by a ring and brush assembly 24 and a rotating diode rectifier system 25. For example, a tri-phase current can be fed to the rectifier system, as illustrated. A motor 26 for driving the roller 8, and a fixed metallic frame 27 for supporting the drum 2 by means of a bearing 28, are also illustrated in FIG. 2. The arrows in the Figure indicate the direction of the flow of a cooling fluid for the rotor and the drum.

The heating device is conveniently used for heating thin metallic items in strip form. In this case, the item itself is the element in which the heating current is induced.

Figure 3:
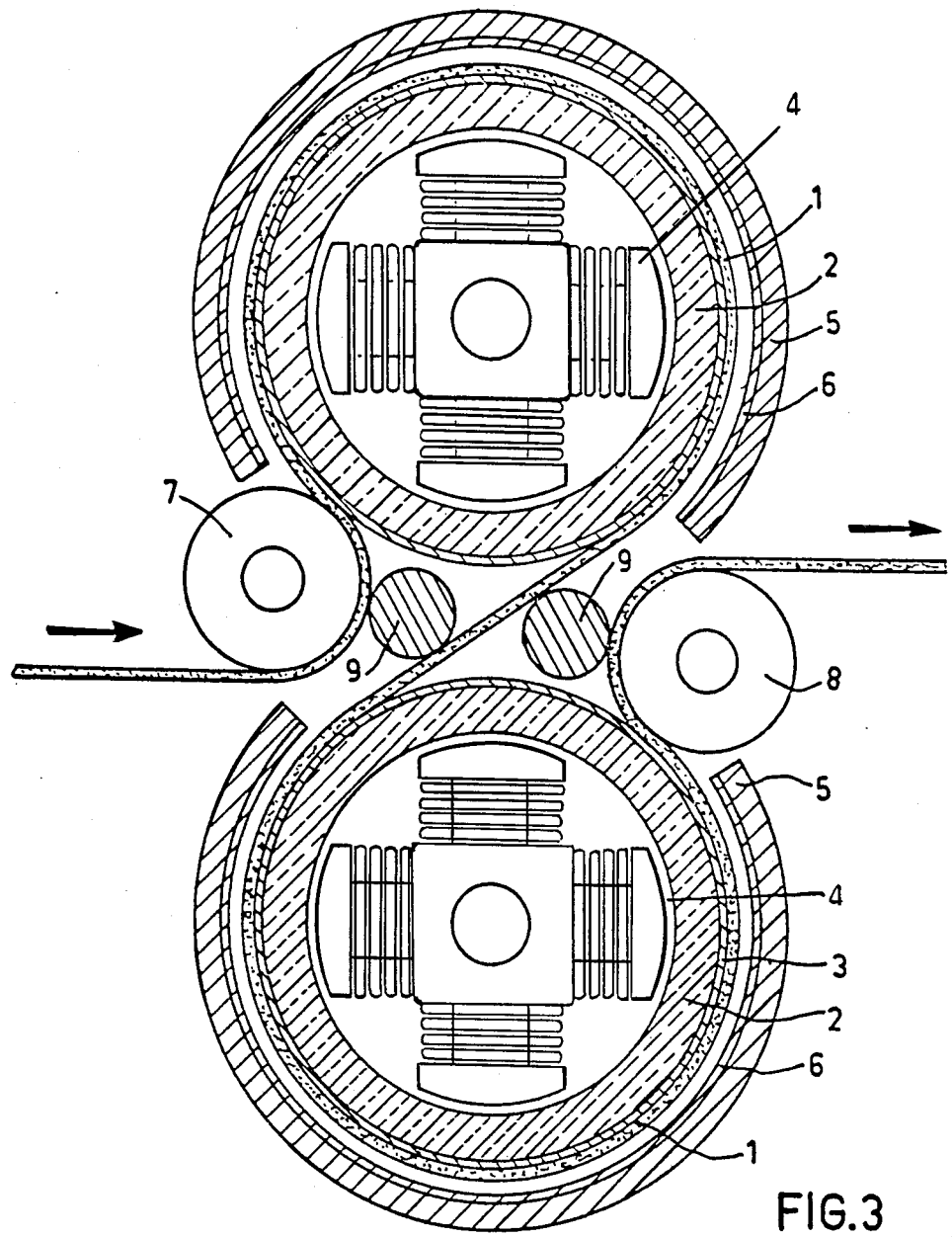
FIG. 3 is a transverse cross-sectional view of a heating device including two associated heating units.

A second embodiment of a heating device constructed according to the present invention is illustrated in FIG. 3. In this embodiment, two indentical heating units are associated with the same continuous item 1. The two units are arranged such that the strip forms two symmetric loops in relation to a central axis parallel to the linear portions of the path of travel of the strip. The device includes two drums 2 in which the inductors 4 rotate. The strip 1 passes successively around each drum following a path which has substantially a figure-8 shape.

Among the advantages of this embodiment are its compactness, the requirement for only two driving rollers 7 and 8, and the very reduced traction on the item 1 at the input and output ends of the device. Since the inductors are preferably rotating in the same direction, and are on opposite sides of the item, the driving couples which they impose on the strip compensate one another.

In the case where this embodiment is used for the annealing of the metal sheets, it may be especially desirable to impose a certain traction on the sheet during the annealing so as to eliminate the stress of lamination. To achieve this result, the speeds of the driving motors for the inductors are adjusted so that they are slightly different. In this manner, a desired speed of strip feed can be obtained by controlling the dissymmetry in the rotating speeds of the two inductors. As discussed previously, an electrical shunt 9, comprised of conductive rollers, assures the closing of the current loops induced in the spires of the item. A yoke 5, made from magnetic material, surrounds each drum 2 and inhibits the dispersion of magnetic flux.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. Apparatus for direct electromagnetic inductive heating of a metallic strip-shaped item in a continuous pass process wherein the metallic item forms the inductive element, comprising:
    a hollow refractory drum having an exterior surface and means for guiding a continuously moving metallic strip shaped item along a path whereby the item is supported on said exterior surface of said drum and forms a substantial portion of an appreciably circular loop;
    a magnetic inductor including a plurality of magnetized poles disposed within said drum with their polarized surfaces parallel to, and arranged about, the central axis of said loop, for generating a magnetic field of constant strength,
    means for rotating said inductor about said axis to provide relative motion between said inductor and the metallic item; and
    means external to said drum and the loop for providing a return path for the magnetic flux around and across said loop, whereby said portion of the loop formed by said metallic item forms an inductive element that is directly heated by said magnetic field.

2. Apparatus according to claim 1, wherein the poles of said inductor are permanent magnets with alternating polarities.

3. Apparatus according to claim 1, wherein the poles of said inductor are electromagnets of alternating polarities which are fed with direct current.

4. Apparatus according to claim 1, wherein said guiding means includes rollers, at least one of which is provided with a driving device.

5. Apparatus according to claim 1, wherein said refractory drum is driven by a motor, said motor functioning as a brake.

6. Apparatus according to claim 1, wherein said means for providing a return path comprises an external yoke of foliated metal sheets with openings to allow for the passage of the strip and to accommodate said guiding means.

7. Apparatus for heating a metallic item in strip form in continuous pass by induction including two heating devices according to claims 1, 2, 3, 4, 5 or 6, symmetrically arranged so that the metallic strip will follow a path appreciably in the shape of an 8, wherein both inductors rotate in the same direction.

8. Apparatus according to claim 7, wherein the inductors are driven in rotation at different speeds.

9. The apparatus of claim 1 or 6 further comprising means for closing the electrical current path of said loop.

* * * * *